(12) United States Patent
Piller et al.

(10) Patent No.: US 11,173,552 B2
(45) Date of Patent: Nov. 16, 2021

(54) HOLE SAW (71) Applicant: MILWAUKEE ELECTRIC TOOL CORPORATION, Brookfield, WI (US)

(72) Inventors: Geoffrey R. Piller, Grafton, WI (US); Jason M. Thom, Wauwatosa, WI (US); Ryan J. Malloy, Milwaukee, WI (US); Todd A. Taylor, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/785,509

(22) Filed: Feb. 7, 2020

(65) Prior Publication Data

US 2020/0171585 A1 Jun. 4, 2020

Related U.S. Application Data

(63) Continuation of application No. 16/143,613, filed on Sep. 27, 2018, now Pat. No. 10,751,811, which is a continuation of application No. 15/407,005, filed on Jan. 16, 2017, now Pat. No. 10,086,445, which is a continuation of application No. 13/945,643, filed on Jul. 18, 2013, now Pat. No. 9,579,732.

(60) Provisional application No. 61/673,124, filed on Jul. 18, 2012, provisional application No. 61/717,389, filed on Oct. 23, 2012, provisional application No. 61/784,172, filed on Mar. 14, 2013.

(51) Int. Cl.
*B23B 51/04* (2006.01)
(52) U.S. Cl.
CPC ...... *B23B 51/0406* (2013.01); *B23B 51/0453* (2013.01); *B23B 2251/428* (2013.01); *B23B 2260/072* (2013.01); *B23B 2260/082* (2013.01); *Y10T 408/895* (2015.01)

(58) Field of Classification Search
CPC ............. B23B 51/0406; B23B 51/0453; Y10T 408/895
USPC ................................. 408/204, 205, 206, 703
See application file for complete search history.

(56) References Cited

U.S. PATENT DOCUMENTS

| 6,817,936 B1* | 11/2004 | Skeem | B23D 61/18 451/547 |
|---|---|---|---|
| 7,237,291 B2* | 7/2007 | Redford | B25B 13/06 7/138 |
| 2006/0016315 A1* | 1/2006 | Zorich | B23D 61/025 83/835 |
| 2011/0170969 A1* | 7/2011 | Novak | B23B 51/0453 408/205 |

* cited by examiner

*Primary Examiner* — Eric A. Gates
(74) *Attorney, Agent, or Firm* — Morgan, Lewis & Bockius LLP (57) ABSTRACT

A hole saw including a cylindrical body with an outer wall extending along an axis of rotation from a cap end to a cutting end. The cutting end includes a plurality of cutting teeth disposed continuously around a circumference of the cutting end. The hole saw includes at least one elongated aperture disposed along the outer wall of the cylindrical body that is configured to receive a tool for removing one or more plugs from within the cylindrical body. The at least one elongated aperture has a first slot portion disposed adjacent to the cutting end and substantially parallel to the cap end, a second slot portion connected to the first slot portion at a first end of the second slot portion, and a third slot portion coupled to the second slot portion at a second end of the second slot portion opposite the first end.

12 Claims, 11 Drawing Sheets

HOLE SAW

CROSS-REFERENCE TO RELATED APPLICATIONS

This application is a continuation of U.S. application Ser. No. 16/143,613, filed Sep. 27, 2018, which is a continuation of U.S. application Ser. No. 15/407,005, filed Jan. 16, 2017, now U.S. Pat. No. 10,086,445, issued on Oct. 2, 2018, which is a continuation of U.S. patent application Ser. No. 13/945,643, filed Jul. 18, 2013, now U.S. Pat. No. 9,579,732, issued on Feb. 28, 2017, which claims priority to U.S. Provisional Patent Application No. 61/673,124, filed Jul. 18, 2012, U.S. Provisional Patent Application No. 61/717,389, filed Oct. 23, 2012, and U.S. Provisional Patent Application No. 61/784,172, filed Mar. 14, 2013, the contents of each of which are incorporated by reference herein.

BACKGROUND

The present invention relates to power tool accessories, and more specifically, to hole saws.

A hole saw is a type of circular saw with a cylindrical, cup-like body that is rotated about a central axis in order to cut a cylindrical plug from a work piece, thereby forming a circular aperture in the work piece. The plug, or core, of the work piece is received within the cup-like body as the hole saw progresses through the work piece. Under certain conditions, the plug can become trapped within the body, necessitating manual removal of the plug by the user.

SUMMARY

In one embodiment, the invention provides a hole saw including a cylindrical body disposed along an axis of rotation with a side wall extending axially from a cap end to a cutting end. The cutting end includes a plurality of cutting teeth. A cap includes a rim portion seated on the cap end and an axially extending portion extending into the cylindrical body from the cap end. The side wall defines an aperture including a first slot portion and a second slot portion disposed closer to the cap end than the first slot portion. A wall of the second slot portion nearest the cap end is between approximately 0.010 inches and approximately 0.120 inches axially offset from the axially extending portion of the cap.

In another embodiment the invention provides a hole saw. A cylindrical body is disposed along an axis of rotation and includes a side wall extending axially from a cap end to a cutting end. The cutting end includes a plurality of cutting teeth. A cap includes a rim portion seated on the cap end and an axially extending portion extending into the cylindrical body from the cap end. The side wall defines an aperture including a first slot portion oriented substantially perpendicular to the axis and a second slot portion disposed closer to the cap end than the first slot portion. A wall of the second slot portion nearest the cap end is between approximately 0.010 inches and approximately 0.120 inches axially offset from the axially extending portion of the cap. A connecting slot portion connects the first slot portion and the second slot portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-18 illustrate a power tool accessory, such as, for example, a hole-saw, for operation with a power tool (e.g., a drill, a driver-drill, a screwdriver, and the like). In some embodiments, the power tool accessory is operable to cut holes of different sizes in a work piece and/or to remove plugs from the work piece. Each of the embodiments of the invention described below includes a cylindrical body defining at least one slot or aperture (e.g., a pair of slots or apertures). Hole saws including any number (e.g., one, two, three, or more) of the disclosed slots or apertures, and variations thereof, are within the scope of the invention.

Figure 1:
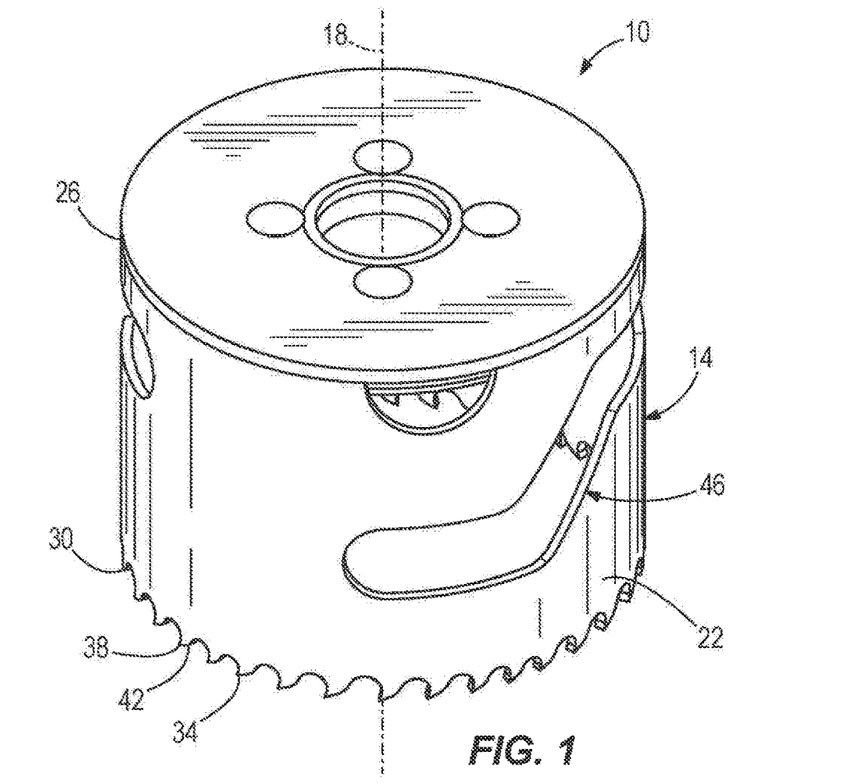
FIG. 1 is a perspective view of a hole saw according to a first embodiment of the invention.

FIGS. 1-4 illustrates an embodiment of a power tool accessory, and more specifically, a hole saw 10. The hole saw 10 includes a cylindrical body 14 disposed along an axis of rotation 18. The cylindrical body 14 is defined by a side wall 22 that extends between a cap end 26 and a cutting end 30. As shown in FIG. 1, the cutting end 30 includes cutting teeth 34. Each of the teeth 34 is defined by a leading edge 38 and a trailing edge 42.

Figure 3:
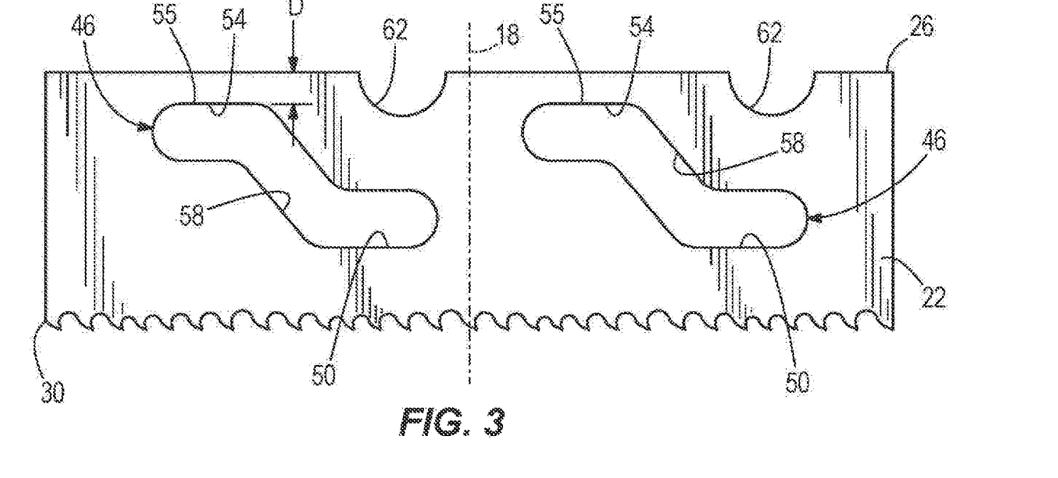
FIG. 3 is a planar view of a cylindrical body of the hole saw of FIG. 1.

As shown in FIG. 3, elongated apertures 46 are defined within the side wall 22. Each elongated aperture 46 is defined by a first slot portion 50 and a second slot portion 54, each orientated substantially perpendicular to the axis 18. The first slot portion 50 is axially disposed closer to the cutting end 30, and the second slot portion 54 is disposed closer to the cap end 26. The first slot portion 50 is offset relative to the second slot portion 54. A connecting slot portion 58 connects the first slot portion 50 and the second slot portion 54. The connecting slot portion 58 is at an angle relative to the cap end 26 and the cutting end 30. The first slot portion 50, the second slot portion 54, and the connecting slot portion 58 all have substantially the same width, though in other embodiments they may have different widths. The second slot portion 54 includes an upper wall 55 that is substantially parallel to the cap end 26 and is located at a maximum distance D of approximately 0.2 inches from the cap end 26. Alternatively, the upper wall 55 of the second slot portion 54 may be flush with the cap end 26 such that distance D is zero, or the second slot portion 54 may extend through a cap (not shown). The apertures 46 are configured to receive a tool (not shown) for removing plugs from within the cylindrical body 14.

As illustrated in FIG. 3, the cap end 26 defines semi-circular slots 62 configured to receive a plug-removing tool (not shown).

Figure 2:
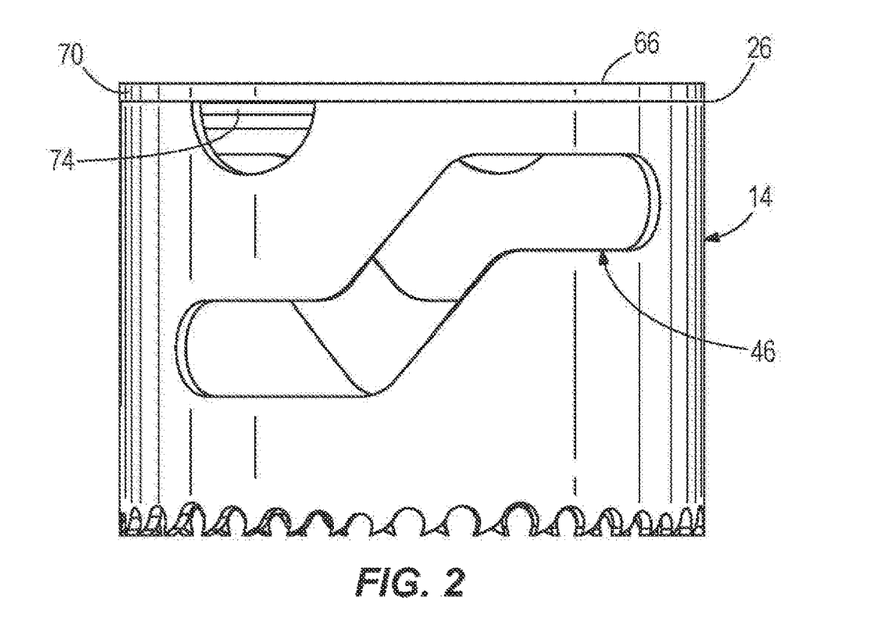
FIG. 2 is a side view of the hole saw of FIG. 1.
Figure 4:
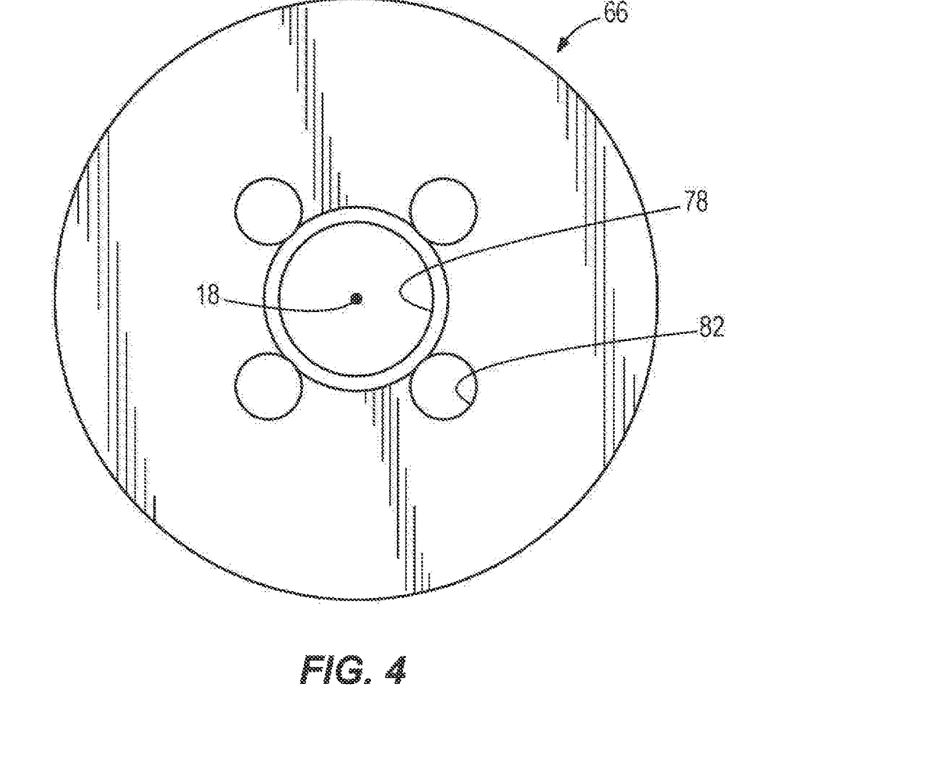
FIG. 4 is a top view of the hole saw of FIG. 1.

Referring to FIG. 2, a cap 66 is coupled to the cap end 26 of the cylindrical body 14. The cap 66 has substantially the same diameter as the cylindrical body 14 and is welded to the cap end 26 with a substantially continuous weld between the semi-circular slots 62. The cap 66 includes a rim portion 70 that seats on the cap end 26 and an axially extending portion 74 that extends into the cap end 26 of the cylindrical body. The rim portion 70 is substantially perpendicular to the axially extending portion 74. As shown in FIG. 4, the cap 66 defines a main aperture 78 centered about the axis 18 and configured to receive a mandrel or equivalent tool (not shown). A plurality of holes 82 are defined in the cap 66 and surround the main aperture 78. The plurality of holes 82 are circumferentially arranged about the axis 18.

Figure 5:
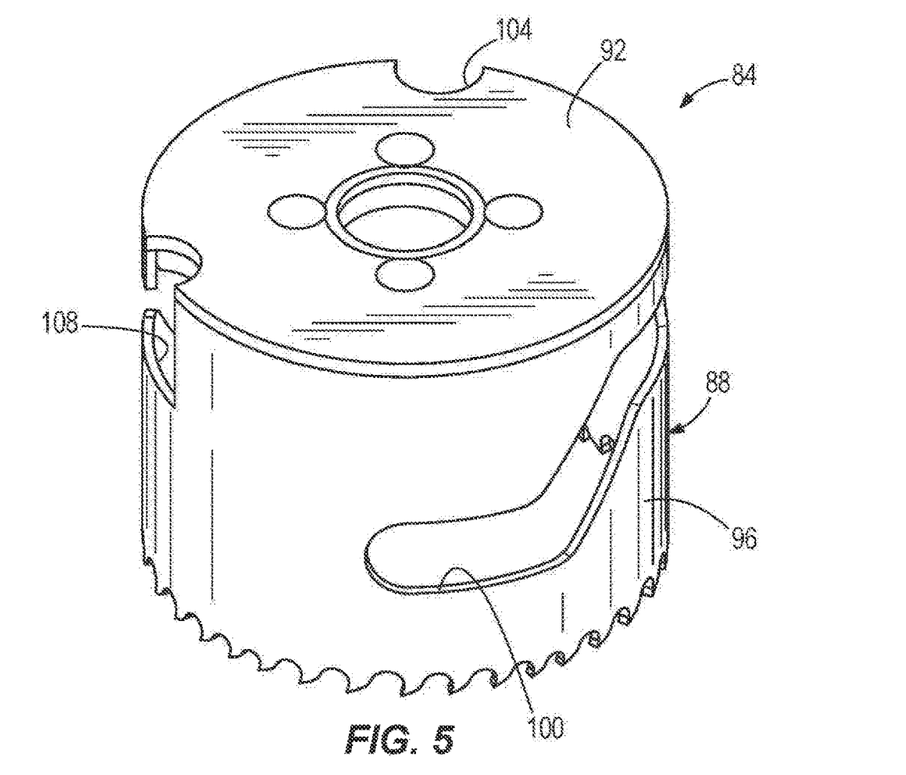
FIG. 5 is a perspective view of a hole saw according to another embodiment of the invention.

FIGS. 5-9 illustrate another embodiment of a hole saw 84. The hole saw 84 has substantial similarities to the hole saw 10 described with respect to FIGS. 1-4, and only those aspects that differ from the embodiments of FIGS. 1-4 will be described herein. Referring to FIG. 5, the hole saw 84 includes a cylindrical body 88 and a cap 92. The cylindrical body 88 includes a side wall 96 having a first aperture 100, a second aperture 104, and a third aperture 108. The apertures 100, 104, 108 are configured to receive a tool (not shown) for removing the plugs from within the cylindrical body 88.

Figure 6:
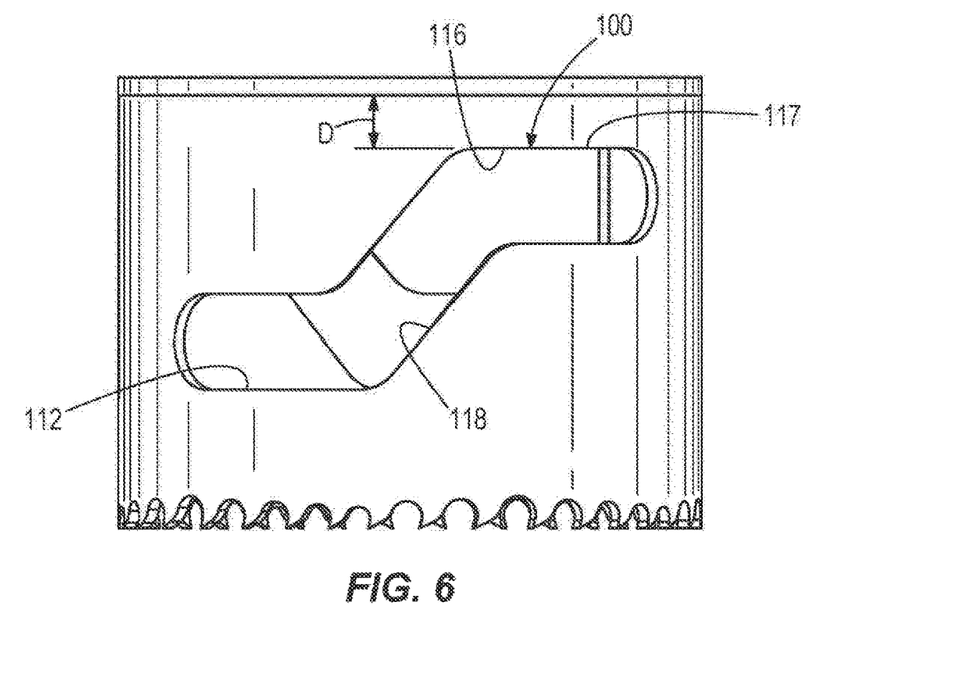
FIG. 6 is a side view of a first aperture of the hole saw of FIG. 5.

As shown in FIG. 6, the first aperture 100 is defined by a first slot portion 112 and a second slot portion 116. The first slot portion 112 and the second slot portion 116 are each orientated substantially perpendicular to the axis 18. A connecting slot portion 118 connects the first slot portion 112 and the second slot portion 116. The second slot portion 116 includes an upper wall 117 that is substantially parallel to the cap end 92 and is located at a maximum distance D of approximately 0.2 inches from the cap end 92. Alternatively, the upper wall 117 of the second slot portion 116 may be flush with the cap end 92 such that distance D is zero, or the second slot portion 116 may extend through the cap 92 (FIG. 5).

Figure 7:
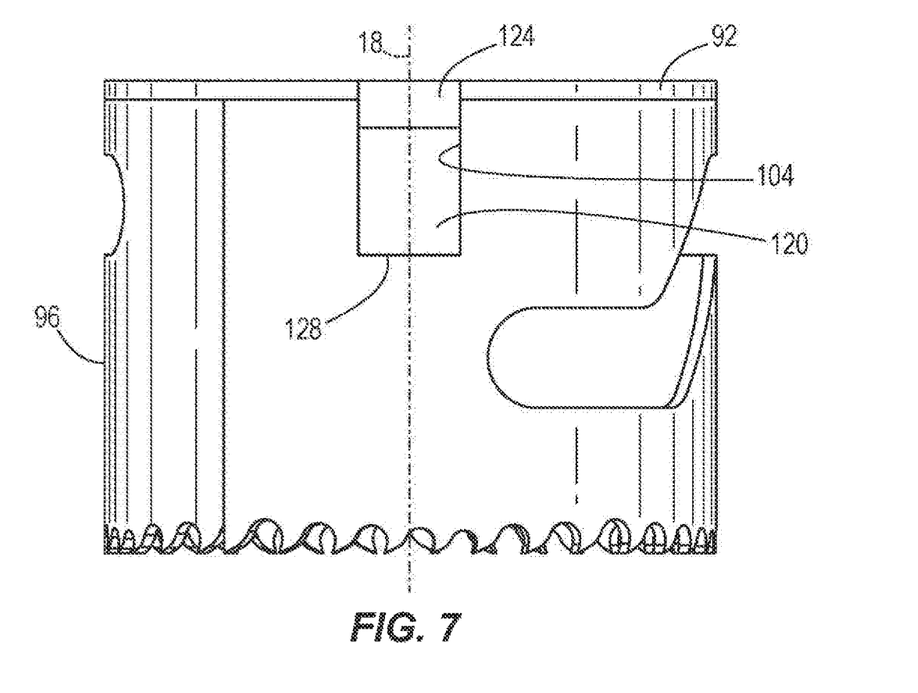
FIG. 7 is a side view of a second aperture of the hole saw of FIG. 5.
Figure 8:
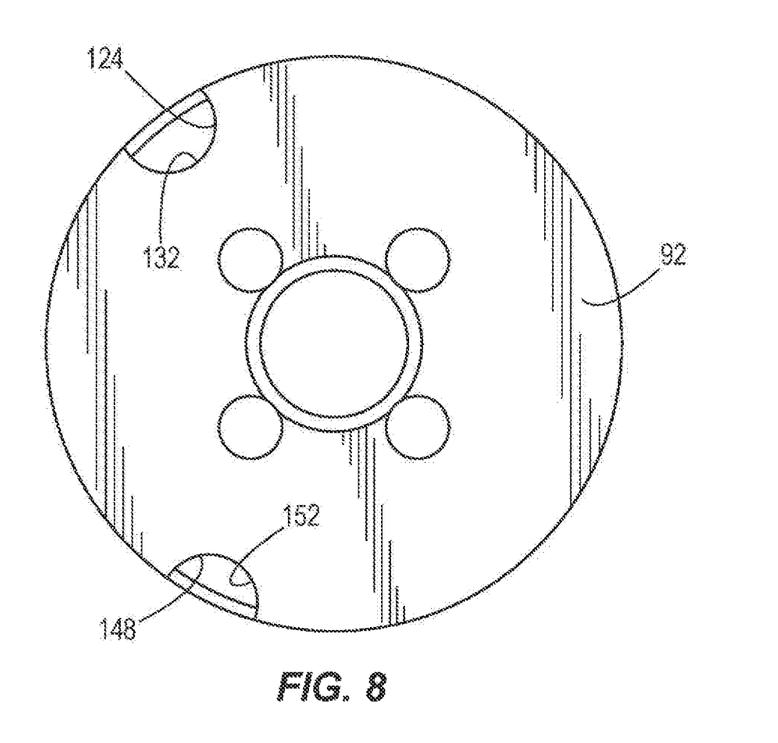
FIG. 8 is a top view of the hole saw of FIG. 5.

As shown in FIG. 7, the second aperture 104 is defined by a sidewall portion 120 and a cap portion 124. The sidewall portion 120 extends through the side wall 96 and terminates at an edge 128 that is substantially perpendicular to the axis 18. The cap portion 124 extends through the cap 92 and terminates at a semi-circular edge 132 as shown in FIG. 8.

Figure 9:
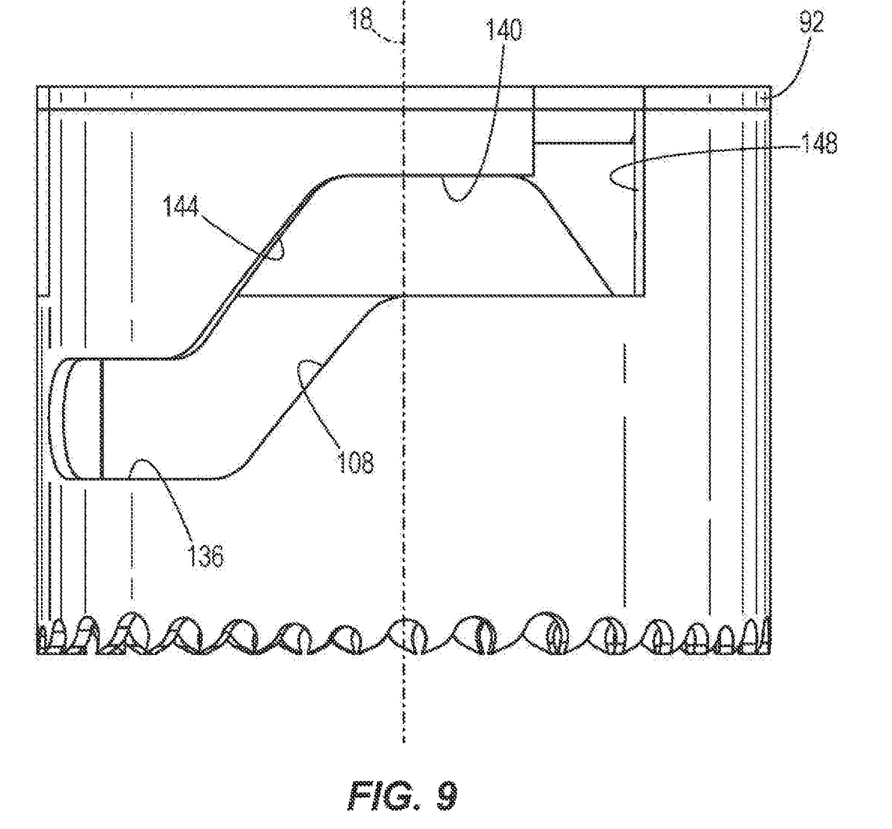
FIG. 9 is a side view of a third aperture of the hole saw of FIG. 5.

Referring to FIG. 9, the third aperture 108 includes a first slot portion 136, a second slot portion 140, a connecting slot portion 144, and a vertical slot portion 148. The first slot portion 136 and the second slot portion 140 are each oriented substantially perpendicular to the axis 18 and are connected by the connecting slot portion 144. The vertical slot portion 148 extends from the second slot portion 140 through the cap 92 and terminates at a semi-circular edge 152 within the cap 92 as shown in FIG. 8.

The cap 92 is welded to the body 88, with a substantially continuous welds interrupted by the cap portion 124 of the second aperture 104 and the vertical slot portion 148 of the third aperture.

Figure 10:
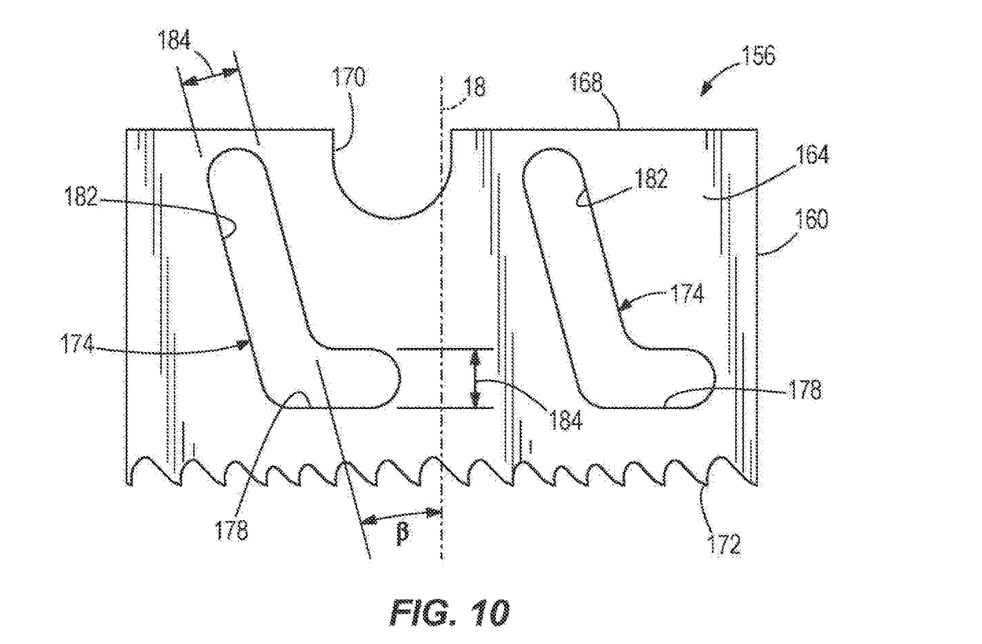
FIG. 10 is a planar view of a cylindrical body of a hole saw according to another embodiment of the invention.

FIG. 10 illustrates yet another embodiment of a hole saw 156. The hole saw 156 has substantial similarities to the hole saw 10 described with respect to FIGS. 1-4, and only those aspects that differ from the embodiments of FIGS. 1-4 will be described herein.

Referring to FIG. 10, the hole saw 156 includes a cylindrical body 160 having a side wall 164 extending between a cap end 168 and a cutting end 172. The cap end 168 defines a semi-circular slot 170 configured to receive a plug-removing tool (not shown).

A pair of elongated apertures 174 are defined within the side wall 164. Each aperture 174 is configured to receive a tool (not shown) for removing work piece plugs from within the cylindrical body 160. Each elongated aperture 174 is defined by a first slot portion 178 and a second slot portion 182. The first slot portion 178 is oriented substantially perpendicular to the axis 18. The second slot portion 182 connects to the first slot portion 178 and is oriented at an angle β relative to the axis 18. In the illustrated embodiment, the angle β is between approximately 14.5 degrees and approximately 15.5 degrees, but other embodiments may include other orientations. The first slot portion 178 and the second slot portion 182 have substantially the same width 184.

Figure 11:
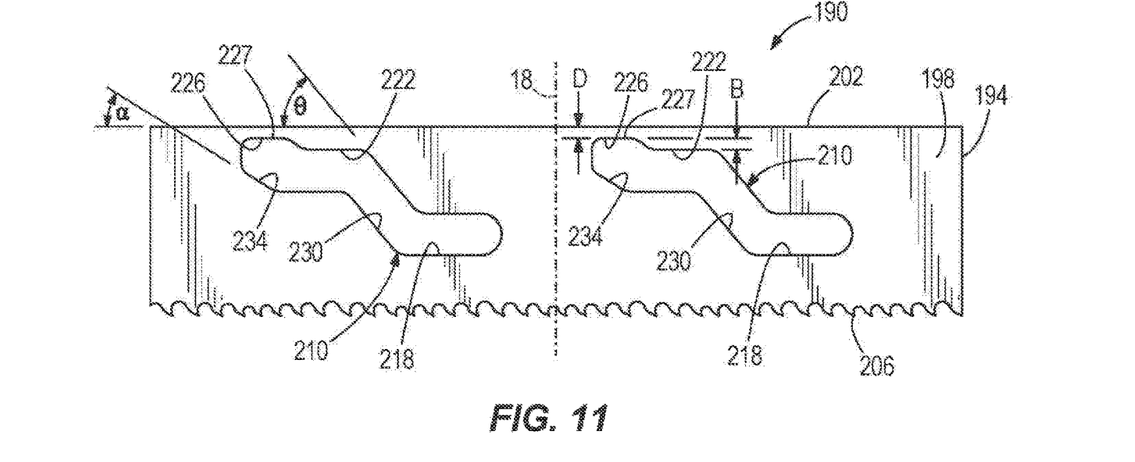
FIG. 11 is a planar view of a cylindrical body of a hole saw according to another embodiment of the invention.

FIG. 11 illustrates yet another embodiment of a hole saw 190. The hole saw 190 has substantial similarities to the hole saw 10 described with respect to FIGS. 1-4, and only those aspects that differ from the embodiments of FIGS. 1-4 will be described herein.

As shown in FIG. 11, the hole saw 190 includes a cylindrical body 194 having a side wall 198 extending between a cap end 202 and a cutting end 206. A pair of elongated apertures 210 are defined within the side wall 214. The elongated apertures 210 are configured to receive a tool (not shown) for removing plugs from within the cylindrical body 194. Each elongated aperture 210 is defined by a first slot portion 218, a second slot portion 222, and a third slot portion 226, each oriented substantially perpendicular to the axis 18. The first slot portion 218 is disposed closer to the cutting end 206, and the third slot portion 226 is disposed closer to the cap end 202. The second slot portion 222 is disposed between the first slot portion 218 and the third slot portion 226. The third slot portion 226 includes an upper wall 227 that is substantially parallel to the cap end 202. The upper wall 227 is offset a distance B from the second slot portion 222. In the illustrated embodiment, distance B is between less than half of an axial height of the aperture 210. The upper wall 227 is located at a maximum distance D of approximately 0.2 inches from the cap end 202. Alternatively, the upper wall 227 of the third slot portion 226 may be flush with the cap end 202 such that distance D is zero, or the third slot portion 226 may extend through a cap (not shown) coupled to the cap end 202.

A first connecting slot portion 230 connects the first slot portion 218 and the second slot portion 222. The first connecting slot portion 230 is oriented an angle θ relative to the cap end 202 and the cutting end 206. In the illustrated embodiment, the angle θ is between approximately 50.2 degrees and approximately 51.2 degrees, but other embodiments may include other orientations.

A second connecting slot portion 234 connects the second slot portion 222 and the third slot portion 226. The second connecting slot portion 234 is oriented at an angle α relative to the cap end 202 and the cutting end 206. In the illustrated embodiment, the angle α is between approximately 31.3 degrees and approximately 32.3 degrees, but other embodiments may include other angle ranges.

Figure 12:
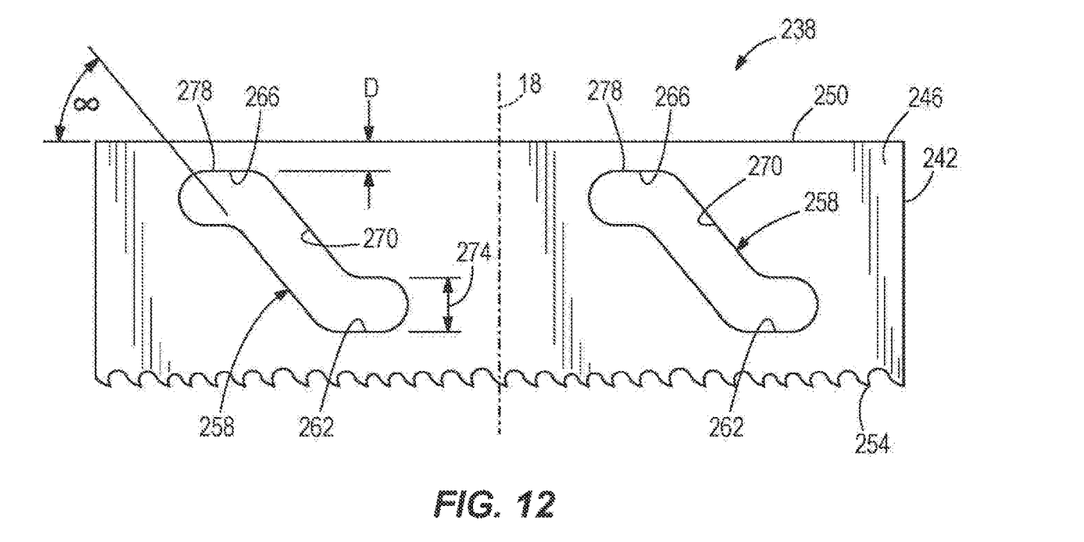
FIG. 12 is a planar view of a cylindrical body of a hole saw according to another embodiment of the invention.

FIG. 12 illustrates yet another embodiment of a hole saw 238. The hole saw 238 has substantial similarities to the hole saw 10 described with respect to FIGS. 1-4, and only those aspects that differ from the embodiments of FIGS. 1-4 will be described herein.

As shown in FIG. 12, the hole saw 238 includes a cylindrical body 242 having a side wall 246 extending between a cap end 250 and a cutting end 254. A pair of elongated apertures 258 are defined within the side wall 246. Each elongated aperture 258 is defined by a first slot portion 262 and a second slot portion 266, each orientated substantially perpendicular to the axis 18. The first slot portion 262 is circumferentially disposed closer to the cutting end 254, and the second slot portion 266 is disposed closer to the cap end 250, whereby the first slot portion 262 is offset relative to the second slot portion 266. A connecting slot portion 270 connects the first slot portion 262 and the second slot portion 266. The connecting slot portion 270 is oriented at an angle ∞ relative to the cap end 250 and the cutting end 254. In the illustrated embodiment, the angle ∞ is between approximately 50.3 degrees and approximately 51.3 degrees, but other embodiments may include other angle ranges. The first slot portion 262, the second slot portion 266, and the connecting slot portion 270 all have substantially the same width 274. The second slot portion 266 includes an upper wall 278 that is substantially parallel to the cap end 250 and is located at a maximum distance D of approximately 0.2 inches from the cap end 250. Alternatively, the upper wall 278 of the second slot portion 266 may be oriented flush with the cap end 250 such that distance D is zero, or the second slot portion 266 may extend through a cap (not shown) coupled to the cap end 250. The apertures 258 are configured to receive a tool (not shown) for removing plugs from within the cylindrical body 242.

Figure 13:
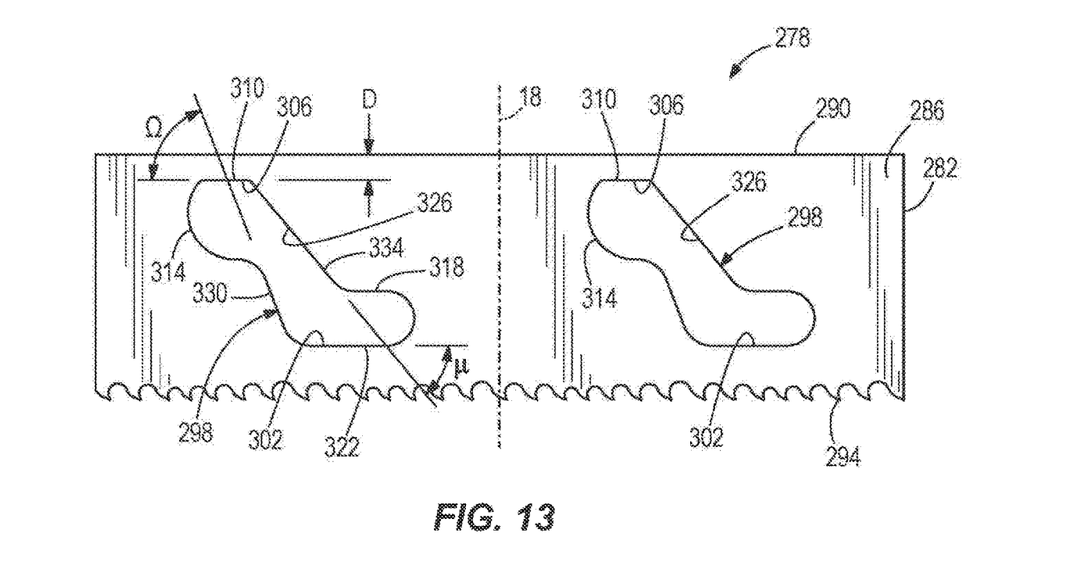
FIG. 13 is a planar view of a cylindrical body of a hole saw according to another embodiment of the invention.

FIG. 13 illustrates yet another embodiment of a hole saw 278. The hole saw 278 has substantial similarities to the hole saw 10 described with respect to FIGS. 1-4, and only those aspects that differ from the embodiments of FIGS. 1-4 will be described herein.

As shown in FIG. 13, the hole saw 278 includes a cylindrical body 282 having a side wall 286 extending between a cap end 290 and a cutting end 294. A pair of elongated apertures 298 are defined within the side wall 286. Each elongated aperture 298 is defined by a first slot portion 302 and a second slot portion 306. The first slot portion 302 is disposed closer to the cutting end 294, and the second slot portion 306 is disposed closer to the cap end 290. The second slot portion 306 includes an upper wall 310 orientated substantially parallel to the cap end 290, and a radial wall 314 extends from the upper wall 310. The upper wall 310 is located at a maximum distance D of approximately 0.2 inches from the cap end 290. Alternatively, the upper wall 310 of the second slot portion 306 may be oriented flush with the cap end 290 such that distance D is zero, or the second slot portion 306 may extend through a cap (not shown) coupled to the cap end 290.

Referring to FIG. 13, the first slot portion 302 includes an upper wall 318 and a lower wall 322, each oriented substantially perpendicular to the axis 18. A connecting slot portion 326 connects the first slot portion 302 and the second slot portion 306 and includes a first wall 330 and a second wall 334. The radial wall 314 connects to the first wall 330, which connects to the lower wall 322. The second wall 334 extends between the upper wall 310 and the upper wall 318. The first wall 330 is oriented at an angle Ω relative to the cap end 290 and the cutting end 294. In the illustrated embodiment, the angle Ω is between approximately 69.5 degrees and approximately 70.5 degrees, but other embodiments may include other angle ranges. The second wall 334 is oriented at an angle μ relative to the cap end 290 and the cutting end 294. In the illustrated embodiment, the angle μ is between approximately 50.1 degrees and approximately 51.1 degrees, but other embodiments may include other angle ranges.

Figure 14:
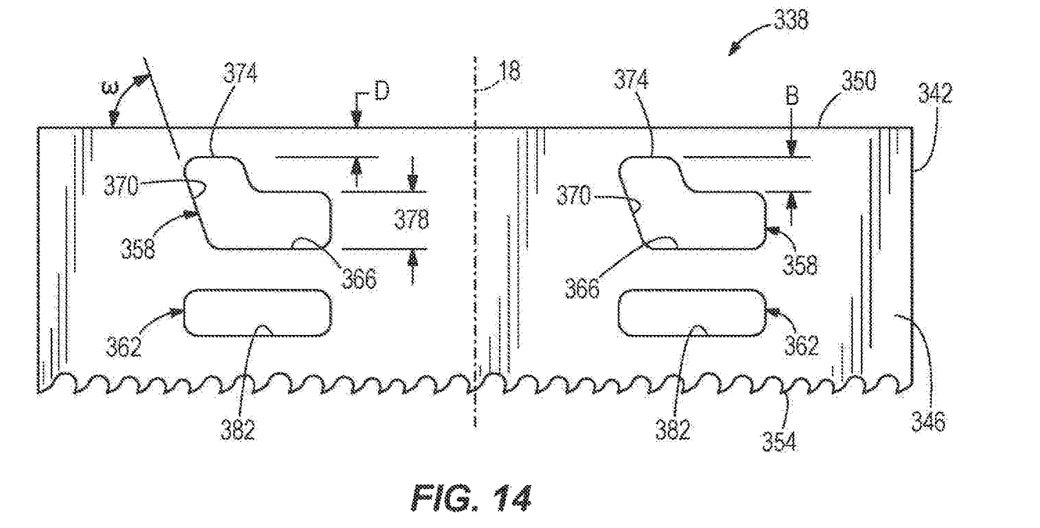
FIG. 14 is a planar view of a cylindrical body of a hole saw according to another embodiment of the invention.

FIG. 14 illustrates yet another embodiment of a hole saw 338. The hole saw 338 has substantial similarities to the hole saws 10 and 156 described with respect to FIGS. 1-4 and 10, and only those aspects that differ from the embodiments of FIGS. 1-4 and 10 will be described herein.

As shown in FIG. 14, the hole saw 338 includes a cylindrical body 342 having a side wall 346 extending between a cap end 350 and a cutting end 354. The side wall 346 includes a first pair of elongated apertures 358 and a second pair of elongated apertures 362. The first pair of elongated apertures 358 are disposed closer to the cap end 350, and the second pair of elongated apertures 362 are disposed closer to the cutting end 354. Each of the first pair of apertures 358 includes a first slot portion 366 and second slot portion 370.

The first slot portion 366 is oriented substantially perpendicular to the axis 18. The second slot portion 370 extends from the first slot portion 366 and is oriented at an angle ω relative to the cap end 350 and the cutting end 354. In the illustrated embodiment, the angle ω is between approximately 69.5 degrees and approximately 70.5 degrees, but other embodiments may include other angle ranges. The second slot portion 370 includes an upper wall 374 that is substantially parallel to the cap end 350. The upper wall 374 is offset a distance B from the lower slot portion 366. In the illustrated embodiment, distance B is less than half of an axial height of the aperture 358. The upper wall 374 is located at a maximum distance D of approximately 0.2 inches from the cap end 350. Alternatively, the upper wall 374 of the second slot portion 370 may be flush with the cap end 350 such that distance D is zero, or the second slot portion 370 may extend through a cap (not shown) coupled to the cap end 350. The first slot portion 366 and the second slot portion 370 have substantially the same width 378.

Each of the second pair of apertures 362 is defined by a first slot portion 382 oriented substantially perpendicular to the axis 18. The first pair of apertures 358 and the second pair of apertures 362 are generally aligned in the same position and orientation relative to the axis 18, though in other embodiments they may be staggered or in other orientations.

Figure 15:
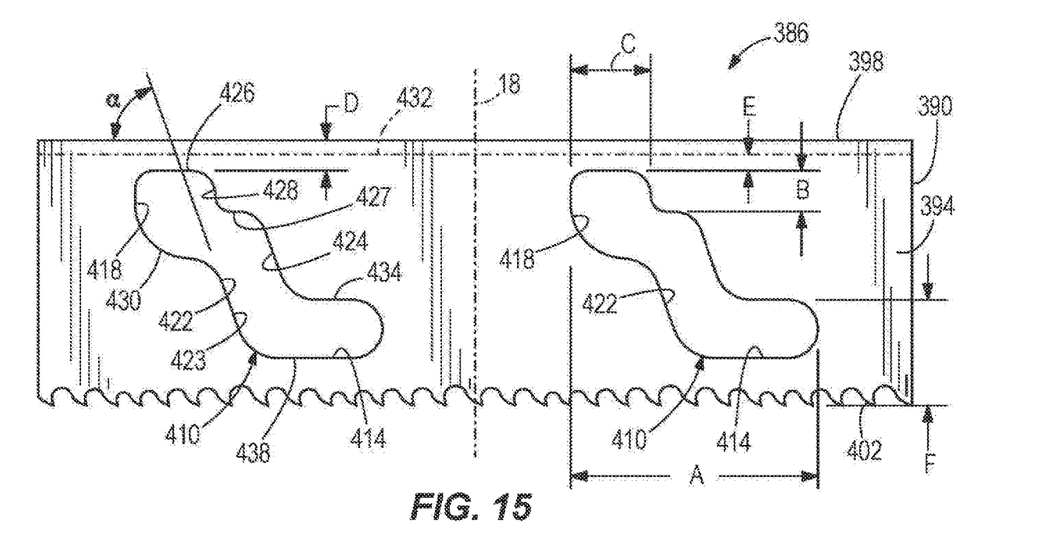
FIG. 15 is a planar view of a cylindrical body of a hole saw according to another embodiment of the invention.

FIG. 15 illustrates yet another embodiment of a hole saw 386. The hole saw 386 has substantial similarities to the hole saw 10 described with respect to FIGS. 1-4, and only those aspects that differ from the embodiments of FIGS. 1-4 will be described herein.

As shown in FIG. 15, the hole saw 386 includes a cylindrical body 390 having a side wall 394 extending between a cap end 398 and a cutting end 402. A pair of elongated apertures 410 are defined within the side wall 394. Each elongated aperture 410 is defined by a first slot portion 414 and a second slot portion 418, each orientated substantially perpendicular to the axis 18. The first slot portion 414 is disposed closer to the cutting end 402, and the second slot portion 418 is disposed closer to the cap end 398. A connecting slot portion 422 connects the first slot portion 414 and the second slot portion 418 and is oriented at an angle α relative to the cap end 398 and the cutting end 402. In the illustrated embodiment, the angle α is between approximately 60 degrees and approximately 80 degrees, more specifically approximately 70 degrees, but other embodiments may include other angles. The connecting slot portion 422 includes a first wall 423 and second wall 424. The elongated aperture 410 has a circumferential width A, measured in a direction parallel to the cap end 398 and cutting end 402. In the illustrated embodiment, the circumferential width A is between approximately 1.250 inches and approximately 2.150 inches, more specifically between approximately 1.475 inches and approximately 1.925 inches, and even more specifically, approximately 1.700 inches. A circumferential width A within these ranges provides for greater access to a user when removing a work piece plug from the hole saw 386.

The second slot portion 418 includes an upper wall 426 orientated substantially perpendicular to the axis 18, a lower wall 427 oriented substantially perpendicular to the axis 18, a side wall 428, and a radial wall 430 that extends from the upper wall 426. The radial wall 430 connects to the first wall 423, which connects to the lower wall 438. The second wall 424 connects to the lower wall 427, which connects to the side wall 428. The upper wall 426 and lower wall 427 are axially separated by a slot height B. In the illustrated embodiment, the slot height B is between approximately 0.018 inches and approximately 0.038 inches, more specifically approximately 0.028 inches. Having slot height B within this range of values provides for optimal removal of deep work piece plugs within the hole saw 386.

A slot width C of the second slot portion 418, measured in a direction parallel to the cap end 398, is between approximately 0.305 inches and approximately 0.805 inches, more specifically, between approximately 0.430 inches and approximately 0.680 inches, and even more specifically, approximately 0.555 inches. A slot width C within these ranges of values allows for a greater range of tools to be inserted into the slot in order to remove a work piece plug. The upper wall 426 is located at a maximum distance D of approximately 0.2 inches from the cap end 398. The upper wall 426 is located an axial offset E from a depth 432 of an axially extending portion of a cap (e.g., the axially extending portion 74 of the cap 66 described with respect to FIG. 2). In the illustrated embodiment, the axial offset E is between approximately 0.051 inches and approximately 0.126 inches, more specifically between approximately 0.072 inches and approximately 0.108 inches, and even more specifically, approximately 0.090 inches. Having an axial offset E within this range of values provides for easier removal of deep work piece plugs from within hole saw 386. Alternatively, the upper wall 426 of the second slot portion 418 may be oriented flush with the cap end 398 such that distance D is zero, or the second slot portion 418 may extend through a cap (not shown) coupled to the cap end 398.

The first slot portion 414 includes an upper wall 434 and a lower wall 438, each oriented substantially perpendicular to the axis 18. The upper wall 434 is disposed a distance F from the cutting end 402. In the illustrated embodiment, distance F is between approximately 0.541 inches and approximately 0.895 inches, more specifically between approximately 0.627 inches and approximately 0.809 inches, and even more specifically, approximately 0.718 inches. Having distance F within this range of values allows a user to apply more axially-aligned force when removing a plug from the hole saw 386. Each aperture 410 is configured to receive a tool (not shown) for removing work piece plugs from within the cylindrical body 390.

Figure 16:
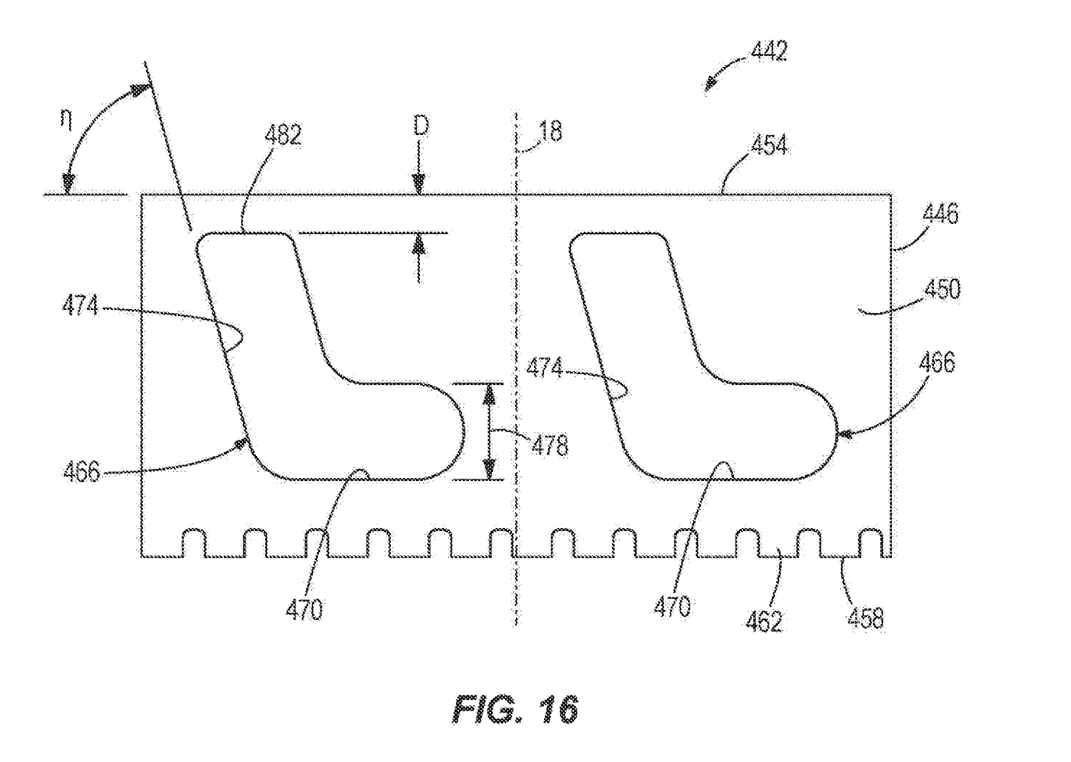
FIG. 16 is a planar view of a cylindrical body of a hole saw according to another embodiment of the invention.

FIG. 16 illustrates yet another embodiment of a hole saw 442. The hole saw 442 has substantial similarities to the hole saw 10, 156, and 338 described with respect to FIGS. 1-4, 10, and 14, and only those aspects that differ from the embodiments of FIGS. 1-4, 10, and 14 will be described herein.

As shown in FIG. 16, the hole saw 442 includes a cylindrical body 446 having a side wall 450 extending between a cap end 454 and a cutting end 458. The cutting end 458 includes a plurality of cutting teeth 462. The plurality of cutting teeth 462 may be coated with an abrasive coating, e.g., diamond grit.

Elongated apertures 466 are defined within the side wall 450. Each elongated aperture 466 is defined by a first slot portion 470 and a second slot portion 474. The first slot portion 470 is oriented substantially perpendicular to the axis 18. The second slot portion 474 connects to the first slot portion 470 and is oriented at an angle η relative to the cap end 454 and the cutting end 458. In the illustrated embodiment, the angle η is between approximately 73.5 degrees and approximately 74.5 degrees, but other embodiments may include other ranges. The first slot portion 470 and the second slot portion 474 have substantially the same width 478. The second slot portion 474 includes an upper wall 482 that is substantially parallel to the cap end 454 and is located at a maximum distance D of approximately 0.2 inches from the cap end 454. Alternatively, the upper wall 482 of the second slot portion 474 may be oriented flush with the cap end 454 such that distance D is zero, or the second slot portion 474 may extend through a cap (not shown) coupled to the cap end 454. Each aperture 466 is configured to receive a tool (not shown) for removing work piece plugs from within the cylindrical body 446.

Figure 17:
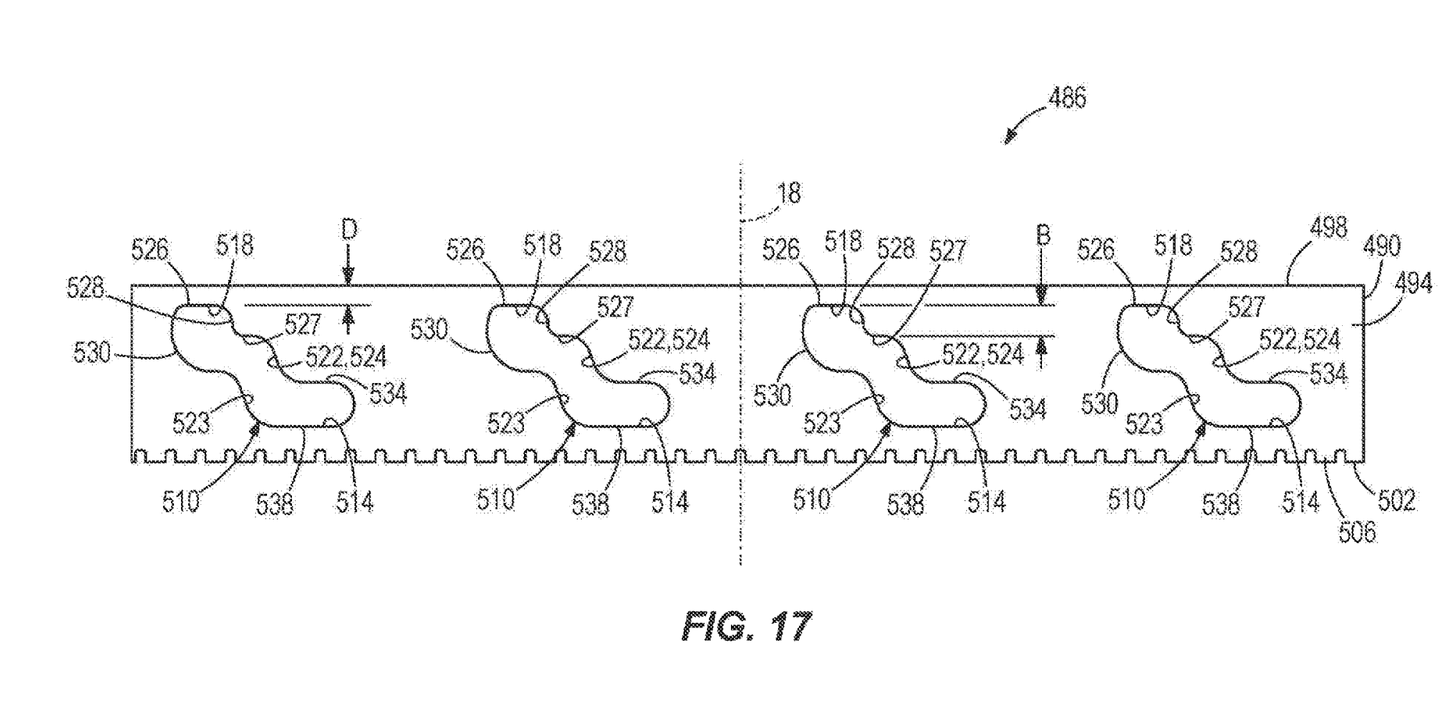
FIG. 17 is a planar view of a cylindrical body of a hole saw according to another embodiment of the invention.

FIG. 17 illustrates yet another embodiment of a hole saw 486. The hole saw 486 has substantial similarities to the hole saws 10 and 386 described with respect to FIGS. 1-4 and 15, and only those aspects that differ from the embodiments of FIGS. 1-4 and 15 will be described herein.

As shown in FIG. 17, the hole saw 486 includes a cylindrical body 490 having a side wall 494 extending between a cap end 498 and a cutting end 502. The cutting end 502 includes a plurality of cutting teeth 506. The plurality of cutting teeth 506 may be coated with an abrasive coating, e.g., diamond grit.

The side wall 494 defines a plurality of elongated apertures 510. Each elongated aperture 510 is defined by a first slot portion 514 and a second slot portion 518, each orientated substantially perpendicular to the axis 18. The first slot portion 514 is disposed closer to the cutting end 502, and the second slot portion 518 is disposed closer to the cap end 498. A connecting slot portion 522 connects the first slot portion 514 and the second slot portion 518 and is oriented at an acute angle relative to the cap end 498 and the cutting end 502. The connecting slot portion includes a first wall 523 and second wall 524.

The second slot portion 518 includes an upper wall 526 orientated substantially perpendicular to the axis 18, a lower wall 527 oriented substantially perpendicular to the axis 18, a side wall 528, and a radial wall 530 that extends from the upper wall 526. A distance B defined between the upper wall 526 and the lower wall 527 is less than half of an axial height of the aperture 510. The upper wall 526 is located at a maximum distance D of approximately 0.2 inches from the cap end 498. Alternatively, the upper wall 526 of the second slot portion 518 may be oriented flush with the cap end 498 such that distance D is zero, or the second slot portion 518 may extend through a cap (not shown) coupled to the cap end 498. The first slot portion 514 includes an upper wall 534 and a lower wall 538, each oriented substantially perpendicular to the axis 18. The radial wall 530 connects to the first wall 523, which connects to the lower wall 538. The second wall 524 connects to the lower wall 527, which connects to the side wall 528. Each aperture 510 is configured to receive a tool (not shown) for removing work piece plugs from within the cylindrical body 490.

Figure 18:
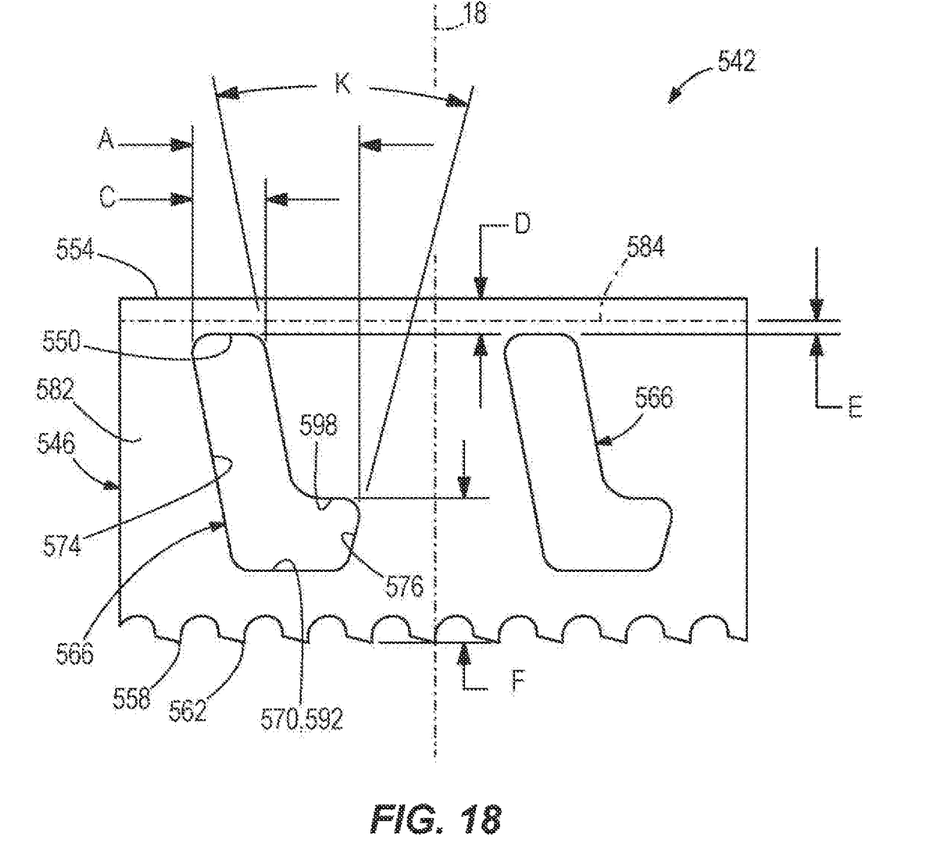
FIG. 18 is a planar view of a cylindrical body of a hole saw according to another embodiment of the invention.

FIG. 18 illustrates yet another embodiment of a hole saw 542. The hole saw 542 has substantial similarities to the hole saw 10, 156, 338, and 442 described with respect to FIGS. 1-4, 10, 14 and 16, and only those aspects that differ from the embodiments of FIGS. 1-4, 10, 14 and 16 will be described herein.

As shown in FIG. 18, the hole saw 542 includes a cylindrical body 546 having a side wall 550 extending between a cap end 554 and a cutting end 558. The cutting end 558 includes a plurality of cutting teeth 562. The plurality of cutting teeth 562 may be coated with an abrasive coating, e.g., diamond grit.

Elongated apertures 566 are defined within the side wall 550. Each aperture 566 is configured to receive a tool (not shown) for removing work piece plugs from within the cylindrical body 446. Each elongated aperture 566 is defined by a first slot portion 570 and a second slot portion 574. The elongated apertures 566 each have a circumferential width A, measured in a direction parallel to the cap end 554 and cutting end 558. In the illustrated embodiment, the circumferential width A is between approximately 0.595 inches and approximately 0.895 inches, more specifically between approximately 0.670 inches and approximately 0.820 inches, and even more specifically, approximately 0.745 inches. A circumferential width A within these ranges provides for greater access to a user when removing a work piece plug from the hole saw 542.

The first slot portion 570 is oriented substantially perpendicular to the axis 18. The second slot portion 574 connects to the first slot portion 570 and is oriented at an angle κ relative to an end wall 576 of the first slot portion 570, where the end wall 576 is oriented at approximately 15 degrees relative to the axis 18. In the illustrated embodiment, the angle κ is between approximately 25.5 degrees and approximately 26.5 degrees, but other embodiments may include other ranges.

A slot width C of the second slot portion 574, measured in a direction parallel to the cap end 554, is between approximately 0.280 inches and approximately 0.480 inches, more specifically, between approximately 0.330 inches and approximately 0.430 inches, and even more specifically, approximately 0.380 inches. A slot width C within these ranges of values allows for a greater range of tools to be inserted into the slot in order to remove a work piece plug.

The second slot portion 574 includes an upper wall 582 that is parallel to the cap end 554 and is located at a maximum distance D of approximately 0.188 inches from the cap end 554. The upper wall 582 is located at an axial offset E from a depth 584 of an axially extending portion of a cap (e.g., the axially extending portion 74 of the cap 66 described with respect to FIG. 2). In the illustrated embodiment, the axial offset E is between approximately 0.010 inches and approximately 0.120 inches, more specifically between approximately 0.030 inches and approximately 0.090 inches, and even more specifically, approximately 0.050 inches. Having an axial offset E within this range of values provides for easier removal of deep work piece plugs from within hole saw 542. Alternatively, the upper wall 582 of the second slot portion 574 may be oriented flush with the cap end 554 such that distance D is zero, or the second slot portion 574 may extend through a cap (not shown) coupled to the cap end 554.

The first slot portion 570 includes an upper wall 588 and a lower wall 592, each oriented substantially perpendicular to the axis 18. The upper wall 588 is disposed a distance F from the cutting end 558. In the illustrated embodiment, distance F is between approximately 0.050 inches and approximately 0.895 inches, more specifically between approximately 0.670 inches and approximately 0.820 inches, and even more specifically, approximately 0.745 inches. Having distance F within these ranges of values allows a user to apply more axially-aligned force when removing a plug from the hole saw 542.

Although the invention has been described with reference to certain preferred embodiments, variations and modifications exist within the scope and spirit of one or more independent aspects of the invention as described.

Thus, the invention provides, among other things, a hole saw. Various features and advantages of the invention are set forth in the following claims.

What is claimed is:

1. A hole saw comprising:
a cylindrical body with an outer wall extending along an axis of rotation from a cap end to a cutting end, the cutting end including a plurality of cutting teeth;
an elongated aperture disposed along the outer wall of the cylindrical body that is configured to receive a tool for removing one or more plugs from within the cylindrical body, the elongated aperture having:
a first slot portion disposed adjacent to the cutting end and substantially parallel to the cap end, wherein the first slot portion includes an upper wall and a lower wall, and a portion of the upper wall and a portion of the lower wall are flat and substantially parallel with the cap end,
a second slot portion connected to the first slot portion at a first end of the second slot portion, the second slot portion disposed at a first angle relative to the cap end, and
a third slot portion coupled to the second slot portion at a second end of the second slot portion opposite the first end, the third slot portion disposed at a second angle relative to the cap end extending toward the cap end.

2. The hole saw of claim 1, wherein the first slot portion, the second slot portion, and the third slot portion are connected via respective upper walls and lower walls.

3. The hole saw of claim 1, wherein a distance between an upper wall of the third slot portion and the cap end is no greater than 0.2 inches.

4. The hole saw of claim 1, wherein the first, second, and third slot portions have a width that is substantially the same.

5. The hole saw of claim 1, wherein the first, second, and third slot portions have different widths.

6. The hole saw of claim 1, wherein the first angle is between 50.2 degrees and 51.2 degrees.

7. The hole saw of claim 1, wherein the second angle is between 31.3 degrees and 32.3 degrees.

8. The hole saw of claim 1, wherein the elongated aperture is a first elongated aperture; and the hole saw further comprises a second elongated aperture similar to the first elongated aperture, wherein the first and second elongated apertures are disposed on opposite sides of a plane passing through the axis of rotation.

9. The hole saw of claim 1, wherein the cap end includes:

a main aperture centrally located at the axis of rotation; and a plurality of holes circumferentially arranged about the axis of rotation.

10. The hole saw of claim 1, wherein the plurality of cutting teeth are coated with an abrasive coating.

11. The hole saw of claim 1, wherein each tooth of the plurality of cutting teeth is defined by a leading edge and a trailing edge.

12. The hole saw of claim 1, wherein the teeth are disposed continuously around a circumference of the cutting end.

\* \* \* \* \*